United States Patent [19]
Koontz et al.

[11] 3,753,237
[45] Aug. 14, 1973

[54] ELECTRONIC STRUCTURE FOR AND METHOD OF RANDOM TOOL SELECTION

[75] Inventors: James L. Koontz; James D. Lewelling, both of Birmingham; Drake C. Fink, Ann Arbor; Robert S. Sutton, Franklin, all of Mich.

[73] Assignee: Ex-Cell-O Corporation, Detroit, Mich.

[22] Filed: June 23, 1971

[21] Appl. No.: 155,732

[52] U.S. Cl. .............................. 340/172.5, 214/11
[51] Int. Cl... G06k 17/00, B65g 47/34, B65g 47/48
[58] Field of Search.................. 340/172.5; 214/11; 151/11

[56] References Cited
UNITED STATES PATENTS

| | | | |
|---|---|---|---|
| 3,105,601 | 10/1967 | Smoll | 214/11 |
| 3,198,351 | 8/1965 | Paglee | 214/11 |
| 3,223,255 | 12/1965 | Graybeal et al. | 214/11 |
| 3,646,521 | 2/1972 | Porter | 340/172.5 |
| 3,465,298 | 9/1969 | La Duke et al. | 340/172.5 |

*Primary Examiner*—Paul J. Henon
*Assistant Examiner*—Paul R. Woods
*Attorney*—L. Gaylord Hulbert et al.

[57] ABSTRACT

A completely electronic circuit for and method of random selection of a tool from a conveyor for use in a machining operation.

10 Claims, 6 Drawing Figures

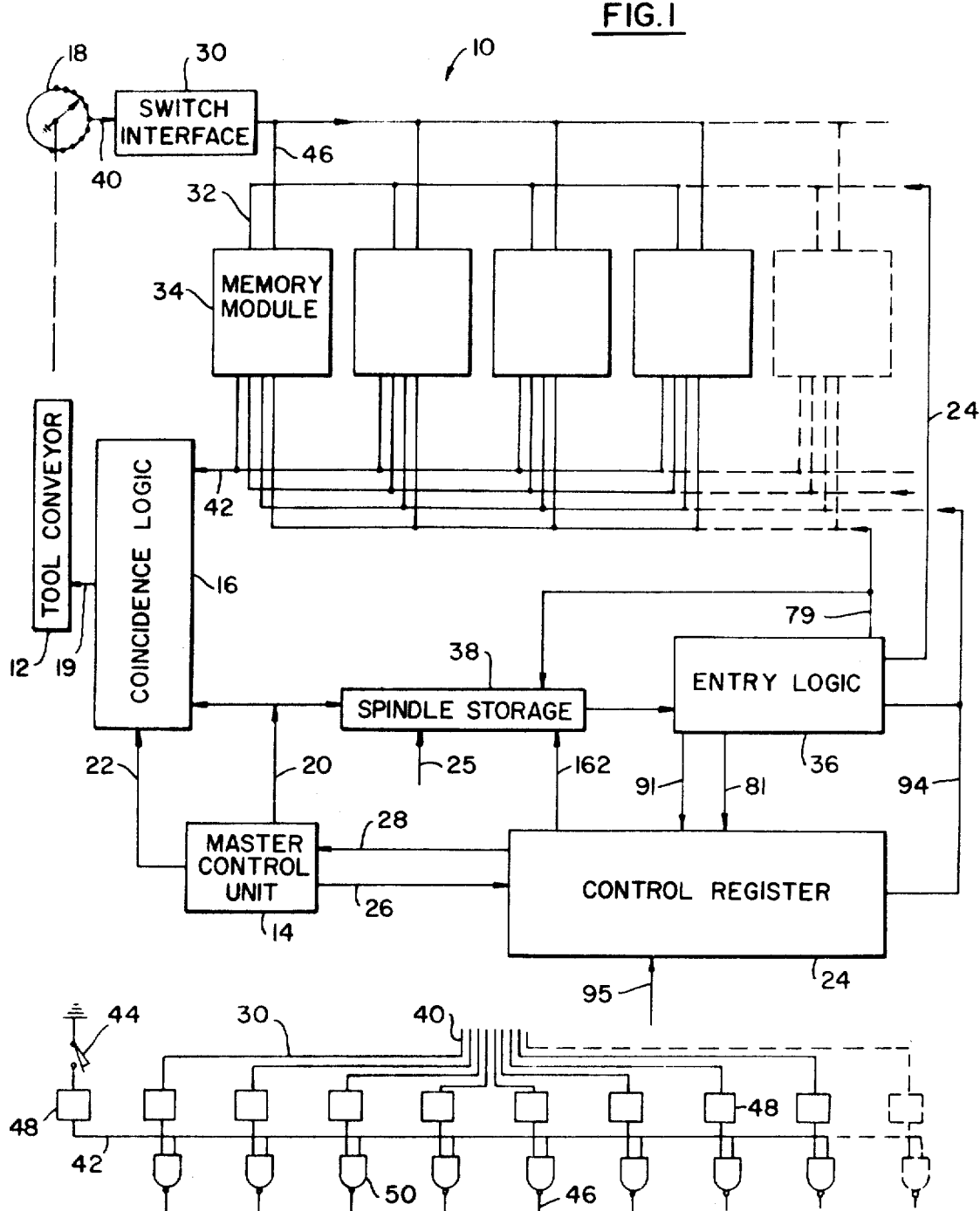

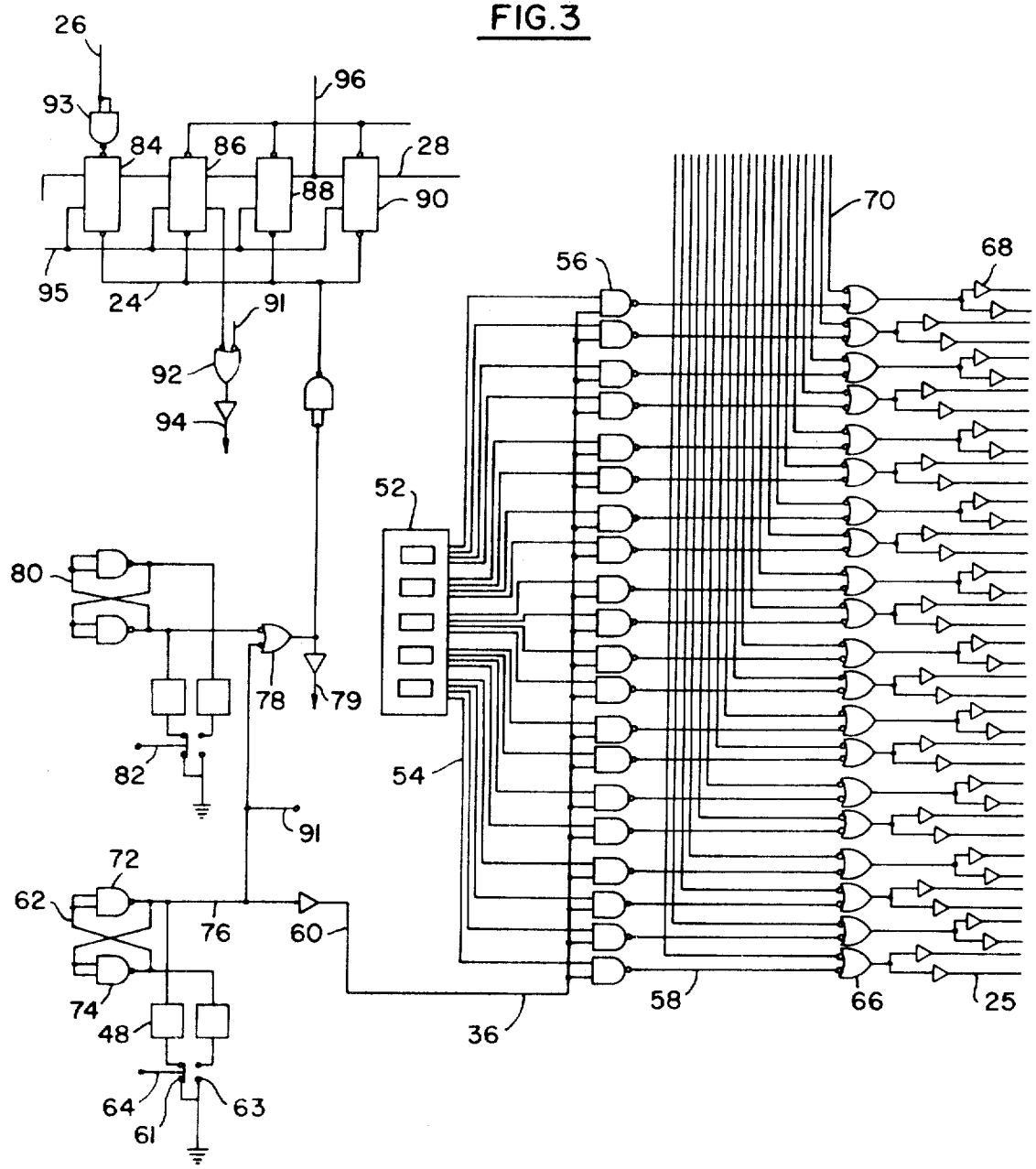

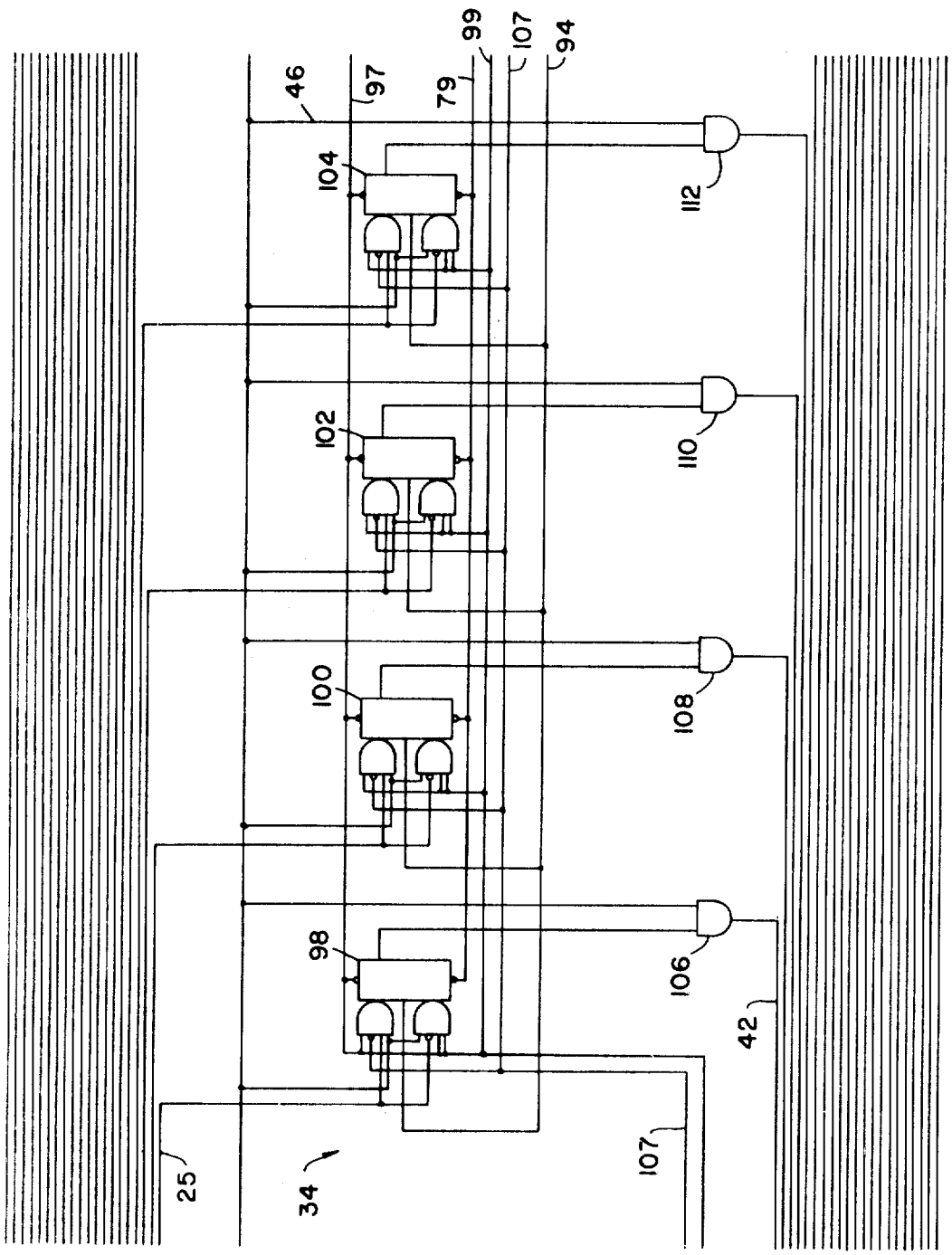

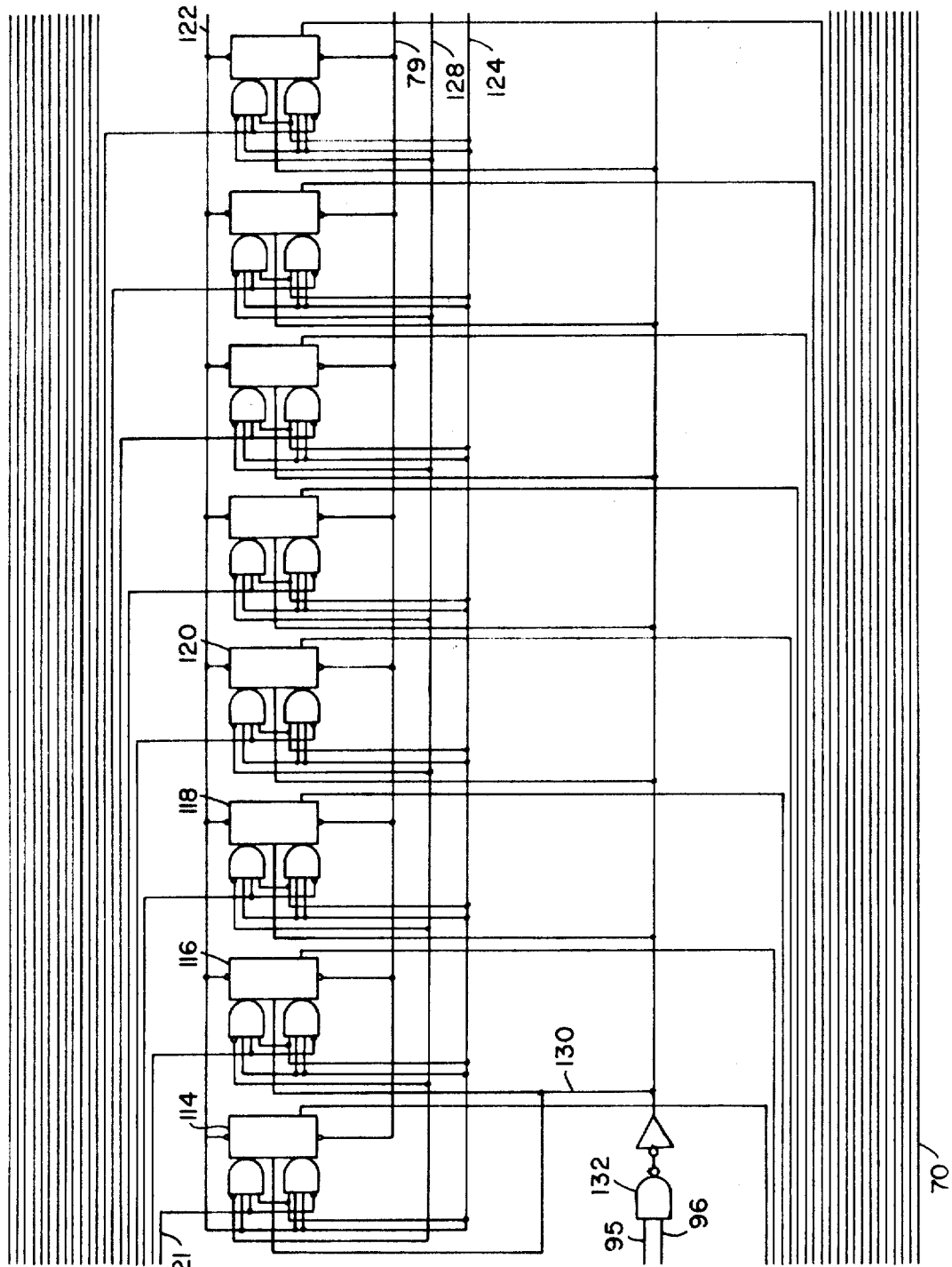

ELECTRONIC STRUCTURE FOR AND METHOD OF RANDOM TOOL SELECTION

The circuit includes a tool code signal circuit having individual memory modules in which a tool code signal assigned to a particular tool on the conveyor are stored, a coincidence logic circuit for comparing the stored tool code signals from the memory modules with a tool code signal of a desired tool from a master control unit as the tool associated with each memory module is moved into a tool exchange location by the conveyor until the desired tool is at the tool exchange location indicated by identity of the compared signals, and means for placing the tool code signal of a tool automatically exchanged with the desired tool at the tool exchange location in the memory module associated with the desired tool after completing a machining operation with the exchanged tool, a spindle storage circuit for storing the tool code signal representing the desired tool which has been transferred to a machine tool for a cutting operation until it is exchanged with a subsequent desired tool on the conveyor after completing a machining operation with the desired tool. The circuit of the invention further includes thumb wheel tool code signal selecting structure for initially placing the tool code signals in the memory modules with the corresponding tool at the tool exchange location which is actuated by a unique push button switch completed circuit including means for preventing bounce of the switch contacts once the contacts have been closed, from cutting off the output from the circuit unless the push button is completely released.

The method of the invention comprises placing separate tool code signals representative of separate tools on a conveyor in separate memory modules and subsequently comparing the signals in the memory modules with signals from a master control unit representing a tool which it is desired to have at a tool exchange location, stopping the conveyor when the signal from a memory module and the master control unit coincide, exchanging tools at the tool exchange location, recording the tool code signal of the tool exchanged for the desired tool in the memory module previously storing the tool code signal of the desired tool, and storing the tool code signal of the desired tool in a separate spindle storage circuit for replacing in another memory module on subsequent exchange of the desired tool with the next desired tool for use in a program of machining.

CROSS REFERENCE TO RELATED APPLICATIONS

This application relates generally to U.S. Pat. application Ser. No. 21,419, filed Mar. 20, 1970, for "Structure for and Method of Tool Selection," which application is assigned to the assignee of the present application. It is intended to include the disclosure of U.S. Pat. application Ser. No. 21,419 in the present application by reference.

BACKGROUND OF THE INVENTION

1. Field of the Invention

The invention relates to automatic tool selection and refers more specifically to an electronic circuit for and a method of random selection of tools moving on an endless conveyor for automatic sequential use in a machining operation or the like.

2. Description of the Prior Art

In the past, automatic tool selection has generally required mechanical coding of tools moving on an endless conveyor and subsequent mechanical sensing of the tools moving on the conveyor as the tools passed into a tool exchange location in their travel on the conveyor. Subsequent removal of a sensed desired tool from the conveyor and replacement of the tool in the same position on the conveyor after a machining operation has been performed in repeated cycles has generally been required by prior tool selection methods and apparatus.

Such automatic tool selection is of necessity relatively slow and often inaccurate in that the mechanical tool code sensing devices are subject to error due to dirt which normally accumulates in an area where machining is accomplished, misalignment of the code sensors provided with coding structures on the tools and the like. Inaccurate sensing of tools in automatic tool changing systems of machining can have disastrous results due to attempting machining with a tool other than that required. In the past, broken tools and ruined workpieces have resulted from inaccuracies in sensing tools at tool exchange locations.

SUMMARY OF THE INVENTION

The electronic circuit for random selection of machine tools moving on an endless conveyor for sequential use in machining operations of the invention is intended to operate in conjunction with a master control unit which is programmed to provide coded output signals representative of tools desired in a machining operation and to determine when a comparison between tool code signals in a tool code signal storage circuit of the circuit of the invention is to be made with the signals representing desired tools and to provide a signal to the circuit of the invention on completion of a tool exchange operation and to be recycled by a signal from the circuit of the invention.

In particular, the circuit of the invention includes a tool code signal storage circuit having individual memory modules for storing signals representative of individual tools moving on a tool conveyor, an entry logic circuit for entering the coded signals representing a tool positioned on the conveyor at a tool exchange location in a memory module, a rotary switch synchronized with the movement of the conveyor for addressing the memory modules sequentially and for maintaining a known relationship between tools on the conveyor and the memory modules, a coincidence logic circuit connected to the memory modules, and a master control unit for comparing signals from the memory modules corresponding to a tool on the conveyor at the tool exchange location with a desired tool code signal from the master control unit and for stopping the movement of the conveyor when coincidence is found indicating that a required tool is at the tool exchange location on the conveyor, a spindle storage circuit for storing the tool code signal of a tool in use which is to be exchanged for a desired tool required by the master control unit, and a control register circuit for receiving a signal indicating that a tool exchange has been accomplished from the master control unit and initiating entry of the tool code signal of the exchanged tool in the memory module previously storing the tool code signal for the tool indcated to be desirable by the master control unit, for subsequently entering the tool code signal for the desired tool in the spindle storage unit and for subsequently providing the master control unit with a signal to initiate a subsequent cycle of operation.

The method of the invention thus comprises placing a plurality of separate tools for machining on an endless movable conveyor at a tool exchange location, storing a tool code signal representative of each of the tools as the tool is placed on the conveyor at the tool exchange location, subsequently addressing each of the memory modules by means of a rotary switch synchronized with movement of the conveyor whereby as each tool sequentially moves into the tool exchange location, the memory module having the assigned tool code signal for the tool at the tool exchange location stored therein is addressed, comparing the tool code signal of the addressed memory module with a required tool code signal from the master control unit and stopping the movement of the conveyor when a signal from a memory module coincides with a required tool code signal from the master control unit indicating the arrival of the desired tool at the tool exchange location. The method of the invention further includes transferring a tool code signal from a spindle storage circuit to the memory module, producing coincidence, which signal represents the tool exchanged for the desired tool and subsequently placing the tool code signal representing the desired tool in the spindle storage circuit for replacing in a different memory module when the desired tool is returned to the conveyor.

In addition, a circuit is disclosed for insuring that a signal will be maintained on closure of a push button once it is initiated until the push putton is completely released even though the contacts associated with the push button bounce. BRIEF DESCRIPTION OF THE DRAWINGS FIG. 1 is a block diagram of an electronic circuit for random selection of tools from a conveyor in accordance with the automatic tool selection method of the invention.

FIG. 2 is a schematic diagram of the rotary switch interface circuit of FIG. 1.

FIG. 3 is a schematic diagram of the control register and entry logic circuits of FIG. 1.

FIG. 4 is a schematic diagram of the tool code signal storage circuit of FIG. 1 including four memory modules of the circuit.

FIG. 5 is a schematic diagram of the spindle storage circuit of FIG. 1.

DESCRIPTION OF THE PREFERRED EMBODIMENTS

Figure 6:
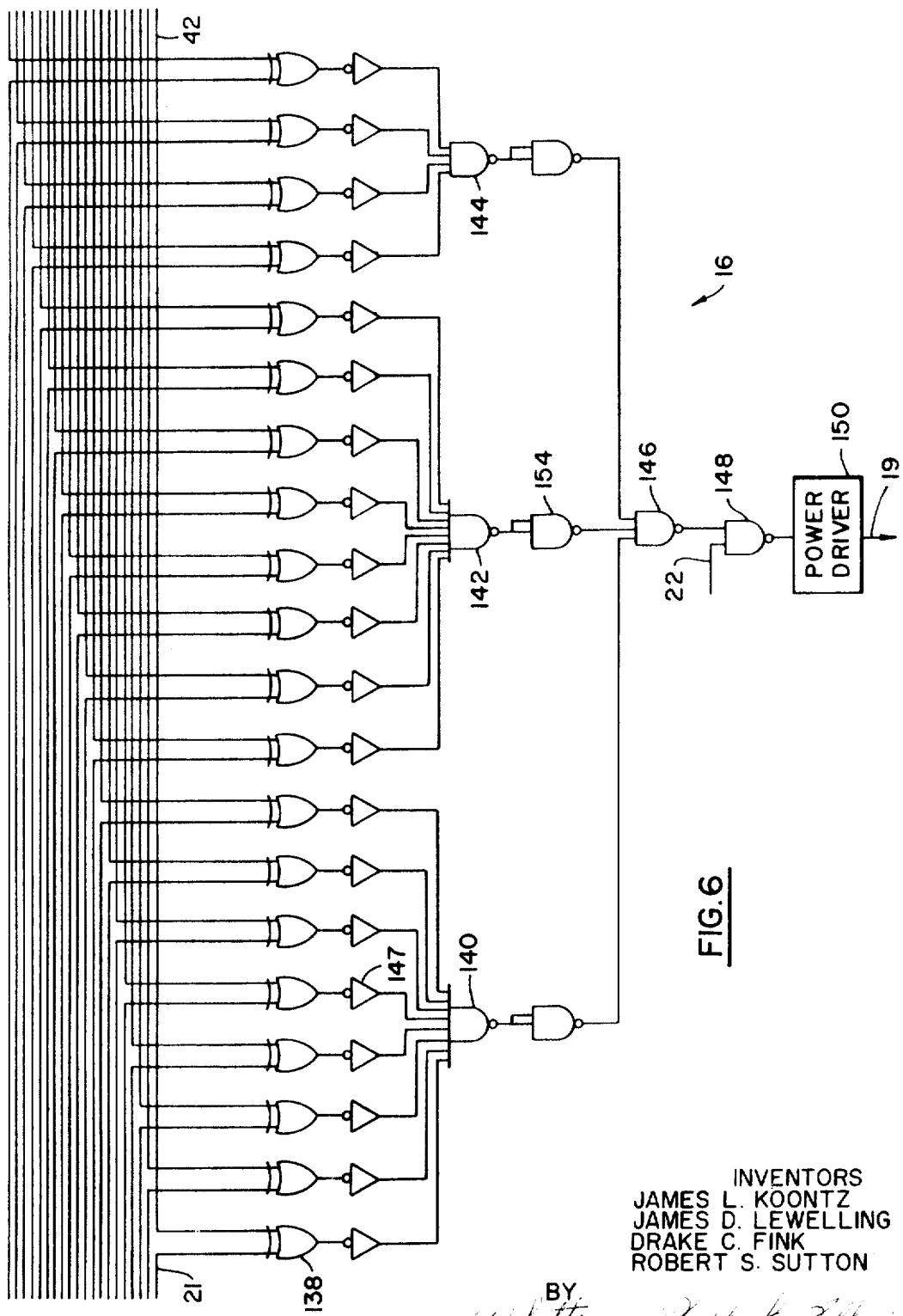
FIG. 6 is a schematic diagram of the coincidence logic circuit of FIG. 1.

The electronic circuit 10 for random selection of tools positioned on an endless moving conveyor 12 is intended for use with a master control unit 14.

The tool conveyor 12 may be of a number of known types which have a plurality of tool-carrying pots or positions thereon. The tool conveyor 12 is intended for use in conjunction with automatic tool changing structure (not shown) which is capable of exchanging a tool in a machine with one on the conveyor at a predetermined tool exchange location with a tool-holding pot or conveyor position at the tool exchange location. Thus, after a desired tool for performing a machining operation is removed from a pot on the conveyor positioned at a tool exchange location, another tool with which a machining operation has already been performed is replaced in the same pot at the tool exchange location.

The tool conveyor 12 is driven by an electronic signal from the coincidence logic circuit 16 over conductor 20 and is synchronized with the position of the rotary switch 18, again in a known manner, so that one section of, for example, a 24-section rotary switch synchronized with a conveyor having 24 tool-carrying pots thereon, is closed as each pot is positioned in the tool exchange location.

The master control unit 14 similarly is not in itself a part of the present invention and will not, therefore, be considered in detail. The master control unit is programmed to sequentially indicate the order of tools required for a series of machining operations by an associated machine tool. The input to the master control unit may be a taped machining program.

The master control unit 14 is adapted to provide an output on line 20 which is a tool code signal; in the present case, a binary coded decimal signal representing a tool which it is desired to select from the conveyor 12. The master control unit also provides a signal over line 22 to the coincidence logic circuit 16 indicating that a tool code signal from the master control unit may be read by the coincidence logic circuit for comparison therein.

Additionally, the master control unit provides an output signal to the control register circuit 24 of the automatic tool selection circuit 10 over line 26 to indicate to the control register circuit 24 that a tool change was programmed and that the tool change has been completed. The master control unit 14 further receives an input signal from the control register circuit 24 over line 28 which informs the master control unit 14 that the tool selection circuit 10 is ready to select the next tool required by the programming of the master control unit.

The electronic tool selection circuit 10, besides the coincidence logic circuit 16, the rotary switch 18 and the control register circuit 24, includes the rotary switch interface circuit 30, the tool code signal storage circuit 32 including a plurality of separate identical memory modules 34, an entry logic circuit 36 and a spindle storage circuit 38, all connected as shown in FIG. 1.

More specifically, the rotary switch interface circuit 30, as shown best in FIG. 2, is connected by twenty-four separate input conductors 40 to separate contacts on the rotary switch 18. A further input is provided to the rotary switch interface circuit 30 over conductor 42 which is adapted to be connected to ground through the voltage level converter 48 and a limit switch 44. Output signals from the interface circuit 30 are provided over the 24 separate conductors 46 to each of the 24 individual memory modules 34 in the tool code signal storage circuit 32.

As shown in FIG. 2, the signals over conductors 40 pass through voltage level conversion circuits 48 to the two input inverting NAND gates 50. The input signals from the conductor 42 similarly are passed to the AND function NAND gates 50. On simultaneous receipt of a signal from a conductor 40 and the conductor 42, an output will be provided from one of 24 NAND gates 50, only nine of which are shown, to address or enable one of the 24 memory modules 34 of the tool code signal storage circuit 32. Only one memory module 34 will be addressed by the switch interface circuit 30 at a time, and the memory module 34 addressed will be determined by the position of the tool conveyor 12.

Since the conductors 40 are connected to separate contacts of the rotary switch 18 synchronized with the tool conveyor 12, a particular memory module 34 will be addressed only when a pot on conveyor 14 associated with a particular contact on the rotary switch 18 is in the tool exchange location. The limit switch 44 will be closed only with a pot on conveyor 14 in the tool exchange location to complete a circuit through the voltage level converter 48 to ground.

It will be understood that voltage level converters 48 are provided in circuit 10 to change the voltage level between 24-volt signals used to insure clean contacts for mechanical switches and the like and the 5-volt operating level of the logic circuitry used.

The entry logic circuit 36 illustrated best in FIG. 3 includes a 5-position thumb wheel selector switch 52 operable to provide a binary coded decimal output signal having five significant figures over the 20 output conductors 54 therefrom. Thus, the output from each position of the thumb wheel switch 52 is over four of the conductors 54 having weights 1, 2, 4 and 8 whereby any decimal figure from zero to nine may be represented. Such thumb wheel selector switches are readily available commercially and are not themselves a part of the invention and will not be considered in detail.

The conductors 54 are connected to one input of two input inverting NAND gates 56 as shown. The NAND gates 56 which provide an AND function, provide an output on conductors 58 in response to a signal over conductor 60, which as shown comes from the enter data circuit 62 on pressing of the push button switch 64. The output signal from the NAND gates 56 are passed through the further OR function NAND gates 66 and subsequently are passed to a memory module 34 which is addressed by the rotary interface circuit 30 through parallel drivers 68 over conductors 25.

Alternatively, a signal may be passed through the OR function NAND gates 66 to the addressed memory module 34 by signals from the spindle storage circuit 38 over the conductors 70. The energizing of the OR function gates 66 by the AND function gates 56 or the spindle storage circuit 38 is determined in accordance with whether the input to the memory module is an initial input thereto, or is an input required due to an exchange of tools on the tool conveyor 12.

The enter data circuit 62 includes the push button switch 64 and two parallel circuits through separate contacts 61 and 63 of the switch 64 and additional voltage converters 48 to the two input NAND gates 72 and 74 connected as shown in FIG. 3, with the inputs of the NAND gate 72 connected together and the output thereof connected to the inputs of the NAND gate 74, and with the inputs to the NAND gate 74 connected together and the output thereof connected to the NAND gate 72.

In operation of the push button switch circuit 62, an output will be provided on conductor 76 on moving the push button 64 to close the contacts 63 to provide an output from the NAND gate 72. The NAND gate 72 will continue to provide an output once contacts 63 have been closed, even though the contacts 63 are subsequently opened and until push button switch 64 is returned to the position in which it is shown in FIG. 3 to close contacts 61, at which time the NAND gate 74 will provide an output and no output will be provided on the conductor 76. Thus, bouncing of the contacts of the push button switch 64 is prevented and the switch 64 must be fully released once it is pressed to change the state of operation of gates 72 and 74.

The output from the enter data circuit 62 is also passed to the OR function NAND gate 78 of the clear memory circuit 80, as shown in FIG. 3, whereby a clearing signal is provided to the addressed memory module and the spindle storage module as well as the control register over lines 79 and 81 prior to initial entry of data into the addressed memory module. The clear memory circuit 80 is provided to clear the circuit 10 at any desired time by manual operation of the push button switch 82 through OR function gate 78. The clear memory circuit 80 is similar in all respects to the enter data circuit 62 and will therefore not be considered in detail. It will be noted, however, that no output signal is provided on line 91 to enable the tool code signal from the spindle storage circuit 38 to be read by the tool code signal storage circuit 32 and no output is provided over conductor 60 on pressing of push button 82.

The control register circuit 24, also shown in FIG. 3, includes four flip-flops 84, 86, 88 and 90 connected as shown to a source of continuous clock pulses (not shown) over conductor 95. On receipt of an enabling input pulse on the conductor 26 from the master control unit 14 and inverter 93, the first clock pulse thereafter will energize the flip-flop 84 so that the second clock pulse will produce a one-output from the flip-flop 86 through the OR gate 92 over conductor 94 to permit reading of the tool code signal stored in the spindle storage circuit 38 and entry thereof in the memory module 34 addressed by the rotary switch interface circuit 30 at that time. On the next clock pulse on conductor 95, an output will be provided from the flip-flop 88 over conductor 96 to permit the spindle storage circuit 38 to read or accept the coded digital signal provided by the master control unit at that time. On the subsequent or fourth clock pulse following the signal to the control register circuit 24 from the master control unit on the line 26, a signal is returned to the master control unit 14 on line 28 indicating that the control circuit 10 has performed its function, and is ready to compare the tool code signal of the next tool required by the master control unit with the signals in the code tool signal storage circuit 32.

As shown best in FIG. 4, the individual modules 34 of the tool code storage circuit 32 are J,K type flip-flops driven by NAND gates which are connected as shown to receive operating voltages over conductors 97 and 99, memory-clear signals over conductor 79, ground signals over conductor 107 and read-enable clock signal inputs over conductor 94. Each module 34 includes five separate circuits as shown in FIG. 4 for the different significant positions in one 5-digit memory so that 20 circuits in all, as shown in FIG. 4, are required for each module 34. 24 modules 34 are required in the present example wherein 24 tool positions are provided on the conveyor 12 and 24 positions are provided on rotary switch 18. As previously indicated, the memory circuits 98, 100, 102 and 104 will provide an output only when the memory module with which they are associated is addressed by the rotary switch interface circuit 30 over the conductors 46. Such operation is insured by the provision of the true AND gates 106, 108, 110 and 112 associated therewith, the outputs of which are fed to the coincidence logic circuit 16 over conductors 42.

The spindle storage circuit 38 illustrated in FIG. 5 includes the separate storage circuits 114, 116, 118 and 120 which are similar to the circuits 98, 100, 102 and 104 of the tool code signal circuit 32 and which form one decade of a 5-decade storage register, two decades of which are shown. The input to the storage register is again operating voltages, a memory-clear signal and a ground signal over conductors 122, 124, 79 and 128. In addition, a read-enable signal is provided to the spindle storage circuits 114, 116, 118 and 120 and the similar decades thereof over conductor 96 through the AND gate 132 on receipt of a clock pulse at gate 132 with a read-enable signal at the gate.

As indicated above, on receipt of a memory-clear signal over conductor 79, the spindle storage memory is cleared, a binary coded decimal signal representing the selected tool is placed in the spindle storage circuit 38 over conductors 21, on receipt of the read-enable signal on conductor 96 and when it is desired to readout the signal in the spindle storage circuit 38, a signal is provided to a memory module 34 addressed by the rotary switch interface circuit 30 at that time on conductor 94.

The coincidence logic circuit 16, as best shown in FIG. 6, includes the exclusive OR circuits 138 connected to receive the twenty input signals from the master control unit 14 over conductors 21 and to receive the output signals from the memory modules 34 over the conductors 42 for comparison. If the signals are not identical, there will be an output through the OR function NAND gate 140, 142 or 144 through the inverters 147 to the OR function NAND gate 146 through inverters 154 which will then provide an output from the AND function NAND gate 148 in conjunction with a signal from the master control unit over the conductor 22.

An output from the AND gate 148 to the power driver 150 will provide a signal to drive the tool conveyor 12 since the output has been produced by noncoincidence of a required tool code signal and a tool code signal stored in a particular addressed memory module 34 indicating that the required tool is not yet at the tool exchange location. On coincidence of the signal from the master control unit 14 and from an address module 34, the output signal to the power driver 150 will be lost to stop the conveyor and the required tool exchange may take place at the tool exchange location.

Thus, in overall operation of the electronic random tool selection circuit 10 of FIG. 1, the conveyor 12 is loaded by moving each pot thereon into the tool exchange location and placing a tool which is assigned a predetermined binary coded decimal number having five digits in the pot. The thumb switch 52 is then adjusted to provide the assigned tool code signal for the tool in the tool exchange location, and the push button 64 is pressed to pass the signal from the thumb switch 52 to the memory module 34 addressed by the rotary switch interface circuit 30 associated with the closed contacts of the rotary switch 18 and the particular position on the conveyor 12.

After the conveyor has been loaded so that the tool code signal storage circuit 32 has tool code signals stored in the memory modules 34 thereof, and after at least one tool exchange operation by the tool exchange structure associated with the tool conveyor and the master control unit 14 so that a tool code signal is provided in the spindle storage circuit 38 from a signal received thereby from the master control unit 14, the master control unit 14 will indicate a desired tool by providing a tool code output signal on the conductor 20 to the coincidence logic circuit 16. The coincidence logic circuit 16 will then provide an output on the line 19 to drive the tool conveyor 12.

As each position on the rotary switch 18 is entered, the signal from the addressed memory module 34 will be compared with the signal from the master control unit 14 in the coincidence logic circuit 16. No output will be provided from the logic circuit 16, however, until a memory module 34 is addressed which provides a tool code signal coincident with the tool code signal required by the master control unit 14 indicating that the tool desired by the program in the master control unit 14 is at the tool exchange location.

At this time, the output from the coincidence logic circuit 16 will cause the conveyor 12 to stop. A tool exchange function is then accomplished by tool exchange equipment (not shown) after which the master control unit will provide a signal on conductor 26 to the control register circuit 24 on the first count of the clock pulse associated with the control register circuit 24. On the second count of the clock, a signal will be provided on the read data conductor 94 to permit reading the signal from the spindle storage circuit 38 into the addressed memory module 34. On the third count of the clock, the control register circuit 24 will provide a signal on the read-enable conductor 96 to the spindle storage circuit 38 permitting entry of a signal from the master control unit representing the required tool to be stored in the spindle storage circuit 38 and on the fourth count of the clock associated with the control register circuit 24, the control register circuit 24 will provide an output signal to the master control unit on line 28 indicating that the tool code signal representing the next desired tool can now be compared with the tool code signals in the memory modules 34 to select a tool for subsequent exchange and the tool conveyor can again move the tool-carrying pots into the tool exchange location until coincidence is again found between a new required tool code signal from the master control unit and a tool code signal from a memory module 34.

Thus, it will be seen that in accordance with the invention, a truly random tool selection circuit for use with automatic tool selection equipment is provided. The tools are not required to have any coding thereon and their position on the conveyor is determined only by their use and the program in the master control unit. Thus, neither the tools nor the code for the tools is associated with a particular position on the moving conveyor. Further, it will be seen that applicant's tool selection circuit is entirely electronic and that it is particularly simple in construction so that it is economical to manufacture and it is efficient in operation.

While one embodiment of the invention has been considered in detail, other embodiments and modifications are contemplated by the inventor. Thus, the particular memory modules and spindle memory circuits may be other types of memory circuits as desired. It is therefore the intention to include all embodiments and modifications as are defined by the appended claims within the scope of the invention.

What we claim as our invention is:

1. An electronic circuit for random selection of tools positioned on a moving conveyor for sequential movement past a tool exchange location comprising a tool code signal storage circuit having a separate memory module for storing a tool code signal corresponding to each individual tool on the conveyor, switch means positioned between the tool conveyor and tool code signal storage circuit for sequentially addressing the individual memory modules as the tool associated with a tool code signal in the memory module arrives at the tool exchange location, a coincidence logic circuit for driving the tool conveyor until coincidence of a required tool code signal and the tool code signal of an addressed memory module applied thereto is sensed and for stopping the conveyor on sensing coincidence of the tool code signals, means for passing a required tool code signal to the coincidence logic circuit and means for passing the tool code signal of an addressed memory module of the tool code signal storage circuit to the coincidence logic circuit for comparison with the required tool code signal passed thereto whereby on coincidence of a tool code signal from a memory module with the required tool code signal the tool conveyor will be stopped with the required tool in the tool exchange location.

2. Structure as set forth in claim 1 and further including means for placing the tool code signal for a tool exchanged for the required tool in the memory module for the required tool after sensing a coincidence of the tool code signal in the memory module and the required tool code signal and spindle storage means for storing the tool code signal of the required tool until it is exchanged for the next required tool and means for subsequently placing the tool code signal of the required tool in the memory module having the tool code signal of the next required tool therein.

3. Structure as set forth in claim 2 and further including means for initially entering a tool code signal in a separate memory module for each tool placed on the conveyor in the tool exchange location.

4. Structure as set forth in claim 3 and further including a control register for timing the input of tool code signals into the spindle storage means and transfer of the tool code signals from the spindle storage means to an individual memory module including a four-position counter, means for providing free-running clock pulses to each position of the counter, whereby on receipt of a first signal input to the first position of the counter a first signal output is provided therefrom on receipt of a first clock pulse, a second signal output is provided from the second position of the counter to enable reading of the tool code signal in the spindle storage means into the memory module addressed at the time of the second clock pulse, a third signal output is provided on the third clock pulse from the third position of the counter for enabling storage of the required tool code signal in the spindle storage circuit and on the fourth clock pulse following the initial actuating pulse an output signal from the fourth position of the counter is provided indicating transfer of a tool code signal from the spindle storage means and a placement of a new tool code signal in the spindle storage means has been accomplished.

5. Structure as set forth in claim 1 wherein the coincidence circuit comprises a separate exclusive OR gate for each significant position of each character of a tool code signal one of which is connected to the memory modules and the other of which is connected to a source of required tool code signals, whereby no signal nal of an addressed memory module is exactly coincident with the tool code signal of a required tool, a plurality of NAND gates connected to groups of the exclusive OR circuits for providing an output signal in response to an output signal from any of the exclusive OR gates, a single NAND gate connected to each of the plurality of NAND gates for providing a single output signal only on occurrence of an output signal from the plurality of NAND gates, and an AND gate for providing an output to drive the conveyor only on occurrence of an output from the single NAND gate and a signal from the source of required tool code signals indicating a required tool code signal is to be compared.

6. Structure as set forth in claim 1 wherein the switch means comprises a rotary switch having a separate pair of contacts for each memory module, a limit switch, means on the conveyor for closing the limit switch each time a tool position on the conveyor is at the tool exchange location, means for synchronizing the rotation of the rotary switch with the movement of the tool conveyor whereby each time the limit switch is closed one pair of contacts are closed in the rotary switch and means connected to the rotary switch and limit switch for addressing a single memory module on simultaneous closing of the limit switch and each of the contacts of the rotary switch.

7. The method of random selection of a tool from a plurality of tools moving on a conveyor past a tool exchange location comprising storing a separate tool code signal for each tool on the conveyor, providing a required tool code signal, comparing the separate tool code signals sequentially with the required tool code signal as the tool represented by the stored tool code signal is moved into the tool exchange location, and stopping driving of the conveyor only when coincidence between a stored tool code signal with the required tool code signal is sensed.

8. The method as set forth in claim 7 and further including storing a required tool code signal while the required tool is in use, and subsequently placing the stored required tool code signal with the stored separate tool code signals in the position of the next required tool code signal in the stored separate tool code signals after coincidence of the next required tool code signal is sensed.

9. Structure for maintaining an output signal after initial closure of one of two alternatively closed contacts to complete a circuit until the one contact has been fully opened to close the other contact comprising a pair of parallel circuits each including one of the contacts, armature means for movement between the contacts to open one of the contacts and close the other of the contacts in operation to complete one of the two parallel circuits therethrough and means connected to the two parallel circuits for maintaining an output from one of them after completing the circuit therethrough even though the armature may break the circuit providing the armature does not return to make the other of the parallel circuits, including a pair of two input NAND gates with the inputs of both gates connected together and with the output of each gate connected to the input of the other gate and with each of the parallel circuits connected at one end to the output of one of the NAND gates.

10. The method comprising the steps of closing one of two parallel circuits through contact structure requiring opening of the other parallel circuit to close the one parallel circuit and maintaining an output signal in response to closing the one parallel circuit even though the contact structure may bounce and open the one parallel circuit until the other of the exclusive parallel circuits is again closed.